Jan. 10, 1928.
G. E. WATTS
1,655,850
PHOTOGRAPHIC CAMERA
Filed Dec. 15, 1921
2 Sheets-Sheet 1
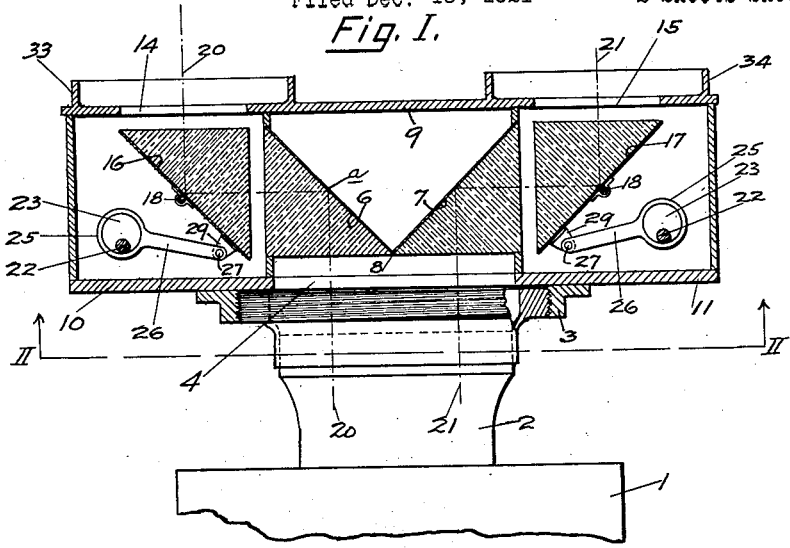
Fig. I.
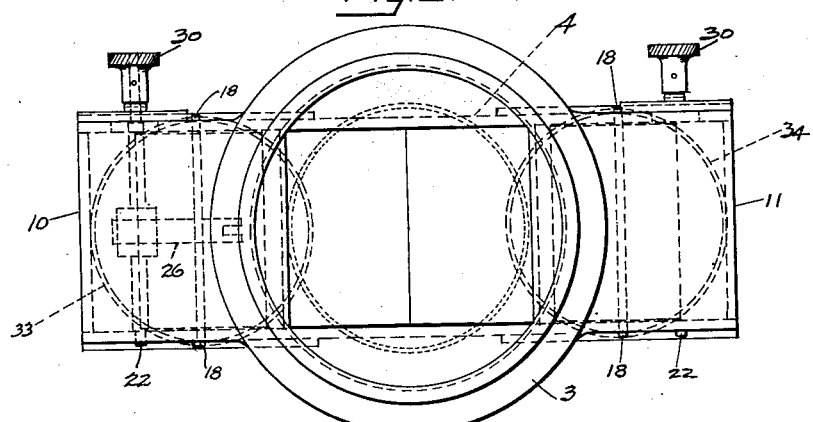
Fig. II.
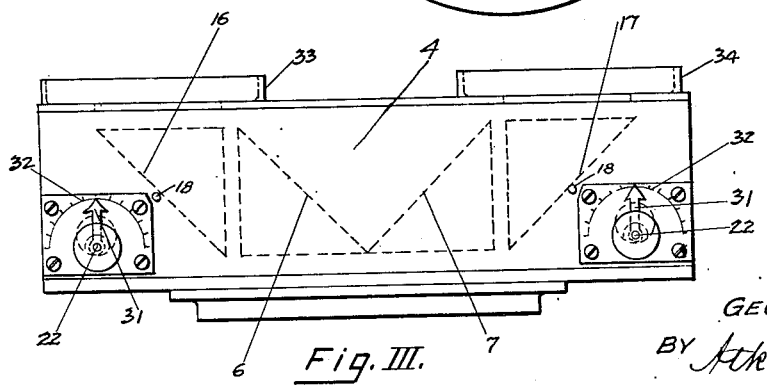
Fig. III.
INVENTOR:
GEORGE E. WATTS,
BY Atkins & Atkins,
ATTORNEYS.

Jan. 10, 1928.
G. E. WATTS
1,655,850
PHOTOGRAPHIC CAMERA
Filed Dec. 15, 1921  2 Sheets-Sheet 2
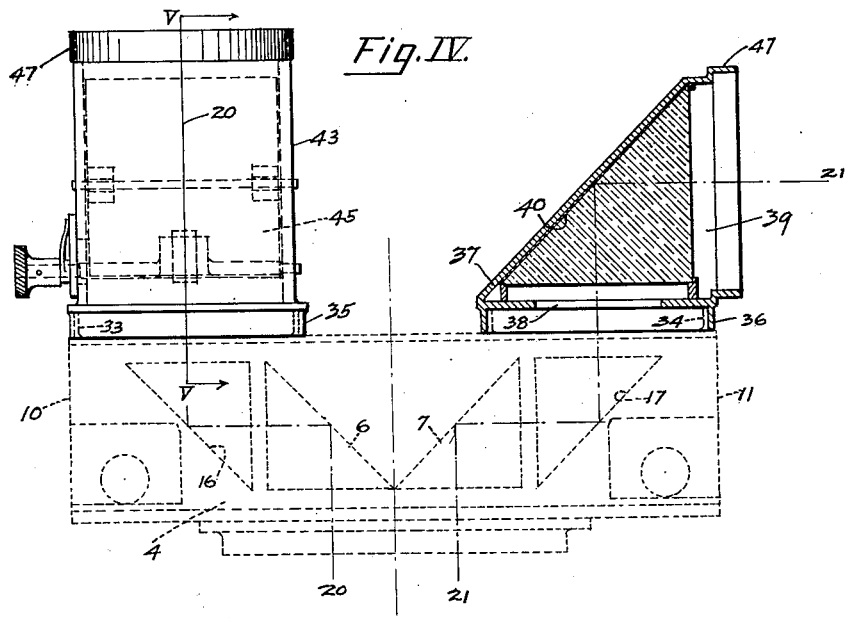
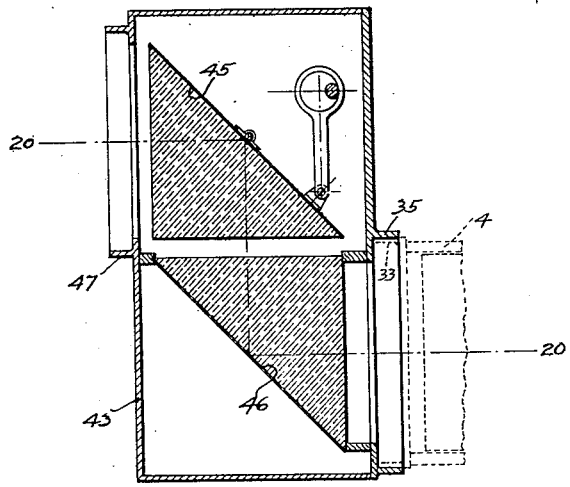
INVENTOR:
GEORGE E. WATTS,
BY Atkins & Atkins,
ATTORNEYS.

Patented Jan. 10, 1928.

1,655,850

UNITED STATES PATENT OFFICE.

GEORGE E. WATTS, OF PORTLAND, OREGON.

PHOTOGRAPHIC CAMERA.

Application filed December 15, 1921. Serial No. 522,550.

My invention relates to improvements in the art of photography, and has for its object, primarily, the production of means for directing by deflection a beam or pencil of light rays from without into a camera against the photographic medium or sensitized surface, which, irrespective of form, is, for convenient brevity, hereinafter designated a plate.

My invention comprehends independent means for simultaneously directing, in like manner, a plurality of beams or pencils of rays, either or both, against a plate, for the simultaneous production of a plurality of photographs on one plate; means for directing the same from an object or objects at different angles of presentment; and means for imparting motion to said beam or pencil during the exposure of the plate to an object that is being photographed, or for imparting independent motion to any one or to all, respectively, of a plurality of beams or pencils of rays during exposure of the plate to a plurality of objects.

My invention is especially, but not exclusively, adapted for use in the taking of moving pictures.

What constitutes my invention will be hereinafter described in detail and succinctly set forth in the appended claims.

In the accompanying drawings, which are illustrative of my invention in present preferred form of embodiment, Figure I is a diagrammatic top plan view of a portion of a camera and its lens-barrel, showing also, in longitudinal section, with parts in elevation, my invention in simple, and for that reason preferred, form of embodiment.

Figure II is a rear elevation of the front portion of the same detached from the lens-barrel, with addition of dotted lines to indicate concealed portions.

Figure III is a top plan view of the subject matter of Figure II, showing portions of the interior thereof in dotted lines.

Figure IV is a top plan view, partly in section and partly in dotted lines, of my device as shown in Figure III, amplified by the addition of ancillary members.

Figure V is a vertical sectional view partly in elevation, of one of the ancillary members shown in Figure IV detached, and taken at right angles to the view shown in the last preceding figure.

Referring to the numerals on the drawings, 1 indicates diagrammatically a camera, and 2 the lens-barrel thereof. Those parts may be of any usual or of any suitable and preferred type and form. To the outer end of the lens-barrel 2, is secured by any suitable means, as, for example, an annulus 3 and an adapter threaded thereto and complementary to the barrel, a closed case 4 that is preferably oblong in shape having one side amplified to accommodate the dimensions of the annulus 3, and made of suitably surfaced sheet metal. The case 4 is denominated a light-conducting case, because, being provided with a hollow interior, it is provided with one or more outside openings through which light is admitted and transmitted into the lens-barrel 2.

In accomplishing the primary object of my invention, as indicated at the beginning of this specification, it is sufficient, as shown, for example, in the right hand ancillary member illustrated in Figure IV, to provide one outside opening in the case 4, and a single reflector in such operative disposition thereto as will suffice to deflect a beam or pencil of light rays admitted through said opening into the case and through it into the interior of the camera through its lens-barrel; but in the device as illustrated and ordinarily preferred, by reason of its being adapted to a greater range of use, I show a case having a plurality of outside openings and of reflectors.

In Figure I, for example, I show two reflectors, 6 and 7, disposed oppositely to each other. They meet in a right angle 8 which is diametrical to the juxtaposed cylindrical end of the barrel 2, and define two sides of a triangle whose third side 9, as shown in Figure I, is a closed portion of the case. The case extends in lateral wings 10 and 11, that are both open within, but are closed on the outside except for the presence in them of openings 14 and 15. Said openings are illustrated in planes at right angles to the longitudinal axis of the barrel 2; but my invention contemplates any other angular disposition of them. That is to say, they may be respectively disposed, for example, in any side that may be preferred of the wing in which they are located.

In the form of embodiment of my invention illustrated, for example, in Figure I, two wings 10 and 11 each accommodates one reflector, indicated, respectively, by the numerals 16 and 17.

Each of said reflectors is suspended within its wings as by a medially disposed rock-shaft 18 that is journaled in bearings in opposite sides of the wing. The position of the reflectors 16 and 17, in which they lie, respectively, parallel to the reflectors 6 and 7, may be denominated their normal position, since it is from that position that swinging adjustment of them on their respective axes 18 is made, as and for the purpose presently to be explained. In that position a deflected line 20, employed to represent the axis of a beam or pencil of rays, entering through the opening 14 strikes the medial line of the reflector 16, and is thence deflected at right angles against the medial line of the reflector 6 which directs it, again at right angles, into the interior of the barrel 2, and in a direction parallel to and at one side of its longitudinal axis. Oscillation of the reflector on its shaft 18 in one or the other direction will produce the effect of causing the angle $a$, of the line 20 where it meets the reflector 6, to travel in one or the other direction or across the medial line of the face of said reflector. That will cause the position of the line 20 to shift to and from the axis of the barrel 2 with the result of shifting the position of an image borne by the light rays in upon the plate of the camera.

In like manner an with like effect, a line 21 extends through the opening 15, between the reflectors 17 and 7. By manipulative movement of either or of both of the reflectors 16 and 17, motion may be imparted to the images communicated by light to them, and made to travel to and from or across the longitudinal axis of the barrel 2, with corresponding effect upon the relative positions of the images in the photographic reproduction thereof on the camera plate.

For effecting said manipulative movement any suitable reflector-actuating mechanism may be provided, as for example that illustrated, in which a rock-shaft 22 is journaled in opposite sides of the respective wings 10 and 11 in parallel relationship to the axis of one of the reflector supporting shafts 18. To each shaft 22 is fixer an eccentric 23 that rotates within an eccentric-ring 25 formed on one end of a link 26 that is hingedly connected as indicated at 27 to a stud 29 on the back of the reflector. The reflector-actuating-mechanism just described is preferred because it is adapted to impart a smooth, even movement to the reflector by the turning of the shaft 22 in either direction. A knurled head 30 fixed to a projecting end of the respective shafts 22 affords simple and convenient means for its manipulation, while an index finger 31 fixed on said shaft and rotating across a graduated dial segment 32 on the case 4 may indicate to the operator degrees of movement of the reflector and consequent relative positions on the plate of the reflected image.

In the foregoing specification I have, to avoid unnecessary limitation, designated the members 6, 7, 16, and 17, simply by the generic term reflector, but I prefer to employ, in each instance of use as illustrated, a reflector having a facing in the form of a 45-degree prism as being the best for the purpose.

The apparatus as above described is in itself complete for many purposes, but I prefer to provided for use, in desired, an additional attachment or attachments, as shown in Figures IV and V. To that end the openings 14 and 15 are shown as provided, respectively, with socket-rings 33 and 34, adapted to enter or to receive with snug fitment and thereby respectively to support, corresponding rings 35 and 36 and their appurtenances. In Figure IV, the ring 36 is illustrated as a part of a closed hollow case 37 that is provided with an inner opening 38, and an outer opening 39, the said openings being at right angles to each other and the former being coaxial to the opening 15. Between the said openings is fixed in suitable mountings a reflector 40 disposed so as to direct an image to the reflector 17 and thence as already specified. By such means, provision is made for taking at the same time more than one picture from different objects that may be considerably separated in space, one from another, and of angular disposition towards each other. The scope of said provision may be extended by the employment of the further attachment illustrated in Figures IV and V, which includes within a case 43, amplified in comparison with the case 37 to accommodate it, an oscillating reflector 45 parallel to a reflector 46 that corresponds to the reflector 40. The case 43 is carried by the ring 35 aforesaid, and the reflector 45 is provided with reflector-actuating-mechanism so like that already described as not to require repetition of description.

It should be observed that the openings 14 and 15 are directed to take objects in front of the camera, while the case 37 opens laterally. The attachment illustrated in Figure V opens either forwardly or laterally, but is adapted, specifically, to impart motion in a vertical direction to an image on the plate.

It may be noted that the rings 33 and 34 are adapted, if desired, to accommodate separate focusing lenses according to requirements of use, and that, to that end, likewise, the cases 37 and 43 are shown as provided with external socket-rings 47.

Also, separate focussing lenses may be operatively mounted if desired in the barrel 2 behind the reflectors of the case 4, and in front of the main lens; but the employment of focussing lenses as suggested in this paragraph and the one last preceding is an expedient familiar in the art of photography and which does not, therefore, require illustration.

The members shown in Figures IV and V and designated ancillary are each complete in itself, and, as such, are, by aid of their respective rings 35 and 36, attached for some purposes directly to the end of the lens-barrel instead of the more highly organized mechanism shown in Figure I.

The operation of my invention will, it is believed, be understood by one skilled in the art from the foregoing specification without further description.

What I claim is:

1. An attachment for photographic cameras consisting in the combination with a light conducting case having a series of intercommunicating reflectors for directing light rays from outside of the case onto the sensitized plate of the camera; of a second light conducting case mounted on the first and having a series of superposed intercommunicating reflectors to transmit light rays from without to the second series of reflectors.

2. An attachment for photographic cameras consisting in the combination with a light conducting case having a series of intercommunicating reflectors for directing light rays from outside of the case onto the sensitized plate of the camera; of a second light conducting case mounted on the first and having a series of superposed intercommunicating reflectors to transmit light rays from without to the second series of reflectors, and a reflector of each series being movable to impart motion to the image upon the sensitized plate.

3. The combination with a taking camera including a lens and a sensitized film, of separate means for reflecting images of the same object or different objects through said lens onto said film simultaneously, each of said separate means being independently movable to an extent to cause said images to traverse each other on said film.

4. Means for producing variable image effects on a single sensitized film from object fields disposed in front of and laterally of said means, and comprising separate reflecting means interposed in the path of light rays from each object field for reflecting the images of said object fields onto said film simultaneously, and means for imparting independent movement to each image upon said film to an extent whereby said images may be made to traverse each other.

5. Means for producing variable image effects on a motion picture film including means for directing images of the same object or separate objects through a lens onto said film simultaneously, said light directing means for each object being independent of each other, and means for separately moving each of said independent light directing means to such an extent as to impart independent relative movement to the images to an extent whereby said images may be made to traverse each other upon said film.

6. The method of producing variable image effects on a motion picture film, which consists in directing images of the same object or two different objects through a lens onto said film simultaneously by positioning in the paths of light rays from each of said objects a separate light reflecting means capable of independent movement to move the images both horizontally, and one of said light reflecting means being independently movable in a direction to move its image vertically upon said film.

7. Means for producing variable image effects on a single sensitized film from objects disposed in front of and laterally of said means and comprising separate reflecting means interposed in the path of light rays from each object for simultaneously directing images of said objects on said film, and means for imparting horizontal movements to one or both images and vertical movements to the other image.

8. The combination with a taking camera including a lens and a sensitized plate, a set of inter-communicating reflectors for directing an image through said lens, a second set of intercommunicating reflectors for transmitting the image to said first set of reflectors, and one reflector of each set being adjustable to impart motion to the image upon said plate.

9. The combination with a taking camera including a lens and a sensitized plate, a pair of separate sets of intercommunicating reflectors for directing images of different objects through said lens onto said plate simultaneously, one of said reflectors of each set being movable to move the image reflected thereby horizontally on said film, and a second set of inter-communicating reflectors cooperating with said first set and having one of its reflectors movable in a direction to impart to the image reflected thereby vertical movement upon said plate.

10. Means for producing variable image effects on a single sensitized plate comprising separate means for directing images of the same object or different objects onto said plate simultaneously, one of said separate means being movable independently of the other to move the image directed thereby entirely across, transversely or vertically, of the image directed by said other separate means.

11. Means for producing variable image effects on a single sensitized plate comprising separate means for reflecting images of the same object or different objects onto said plate simultaneously, each of said separate means comprising a pair of corelated reflectors to transmit only one of said images, and each of said separate means being movable to an extent to cause said images reflected thereby to traverse each other on said plate.

In testimony whereof, I have hereunto set my hand.

GEORGE E. WATTS.